(12) United States Patent
Wang et al.

(10) Patent No.: US 9,367,319 B2
(45) Date of Patent: Jun. 14, 2016

(54) SYSTEM AND METHOD FOR A MULTI-SCHEMA BRANCH PREDICTOR

(75) Inventors: Kai-Feng Wang, Beijing (CN); Hong-Xia Sun, Beijing (CN)

(73) Assignee: STMICROELECTRONICS R&D (BEIJING) CO. LTD., Beijing (CN)

( * ) Notice: Subject to any disclaimer, the term of this patent is extended or adjusted under 35 U.S.C. 154(b) by 1474 days.

(21) Appl. No.: 12/615,108

(22) Filed: Nov. 9, 2009

(65) Prior Publication Data
US 2010/0169626 A1 Jul. 1, 2010

(51) Int. Cl.
*G06F 15/00* (2006.01)
*G06F 9/38* (2006.01)

(52) U.S. Cl.
CPC .......... *G06F 9/3806* (2013.01); *G06F 9/3848* (2013.01)

(58) Field of Classification Search
CPC .............................. G06F 9/3806; G06F 9/3848
USPC .................................................. 712/239, 240
See application file for complete search history.

(56) References Cited

U.S. PATENT DOCUMENTS

| | | | | |
|---|---|---|---|---|
| 5,758,142 | A * | 5/1998 | McFarling et al. | 712/239 |
| 6,223,280 | B1 * | 4/2001 | Horton et al. | 712/240 |
| 6,272,624 | B1 * | 8/2001 | Giacalone et al. | 712/239 |
| 6,550,004 | B1 * | 4/2003 | Henry et al. | 712/239 |
| 6,701,426 | B1 * | 3/2004 | Ries et al. | 712/239 |
| 2001/0021974 | A1 * | 9/2001 | Lee | 712/240 |
| 2002/0194463 | A1 | 12/2002 | Henry et al. | |
| 2002/0199091 | A1 * | 12/2002 | Tago et al. | 712/240 |
| 2005/0066154 | A1 | 3/2005 | Chung | |
| 2005/0114637 | A1 | 5/2005 | John | |
| 2005/0228977 | A1 * | 10/2005 | Cypher et al. | 712/240 |
| 2005/0268075 | A1 * | 12/2005 | Caprioli et al. | 712/239 |
| 2007/0005945 | A1 * | 1/2007 | Hondou | 712/240 |
| 2008/0052501 | A1 * | 2/2008 | Kwak | 712/240 |
| 2009/0037709 | A1 * | 2/2009 | Ishii | 712/240 |
| 2009/0164766 | A1 * | 6/2009 | Suggs et al. | 712/240 |

FOREIGN PATENT DOCUMENTS

CN 1601463 A 3/2005

OTHER PUBLICATIONS

Monchiero; The Combined Perceptron Branch Predictor; 2005.*

(Continued)

*Primary Examiner* — Corey S Faherty
(74) *Attorney, Agent, or Firm* — Allen, Dyer, Doppelt, Milbrath & Gilchrist, P.A.

(57) ABSTRACT

A system and method for predicting the execution of a branch of computer-executable instructions. In an embodiment, a branch predictor may include a program-counter register operable to store a program-counter value and a branch-history register operable to store a branch-history value. Additionally, the branch predictor may include a prediction hash table having a plurality of prediction values each uniquely corresponding to a plurality of memory locations. With these components, the branch predictor may generate a first prediction value that corresponds to the program-counter value and may generate a second prediction value that corresponds to a logical combination of the program-counter value and the branch-history value. With these two prediction values obtained from two different prediction schemas, the branch predictor is better suited to generate an overall prediction value based on the first and second prediction values that is more accurate than a single prediction value based upon a single prediction schema.

22 Claims, 4 Drawing Sheets

(56) References Cited

OTHER PUBLICATIONS

Chen J B et al; "An Analysis of Dynamic Branch Prediction Schemes on System Workloads", May 22-24, 1996, pp. 12-12, vol. Symp 23, Annual Symposium on Computer Architecture, Philadelphia, May 22-24, 1996.

European Search Report for European Patent Application No. 09180315.5, dated Mar. 5, 2010.

* cited by examiner

SYSTEM AND METHOD FOR A MULTI-SCHEMA BRANCH PREDICTOR

PRIORITY CLAIM

The present application claims the benefit of Chinese Patent Application Serial No. 200810190964.1, filed Dec. 25, 2008, which application is incorporated herein by reference in its entirety.

BACKGROUND

In computer architecture, a superscalar computer, i.e., a computer with multiple processing components that may execute more than one instruction per clock cycle, may be used for high-level, computation-intensive applications. Often, superscalar computers will employ one or more pipeline processors that may be used for low-level instruction "crunching" to better handle certain computationally-intensive processes. In the hierarchy of computer programming, such processes may be implemented as a set of instructions that are part of a sub-program called an instruction branch or more simply, a branch. In this manner, a branch may or may not be executed depending on the execution of various aspects of the overall program. In an effort to assist with such computationally-intensive branches, sometimes instructions for a branch are executed ahead of the time when they may be encountered during the execution of a program. A branch predictor may be part of a pipeline processor, or may work in concert with a pipeline processor and may help determine whether a conditional branch in a computer program is likely to be taken or not.

Predicting whether or not to execute a branch in advance is often called branch prediction. Branch predictors are prevalent in today's modern, superscalar processors for achieving better performance. An effective branch predictor allows a processor to fetch and execute a set of instructions without first waiting for a branch to be executed or resolved. Many pipelined processors perform branch prediction of some form because execution time may be saved by starting the execution of complex branches ahead of time using unallocated computational resources (i.e., the pipeline). By predicting correctly that a branch will be executed when an operating program reaches a branch allows time to be saved as unallocated computing power is engaged sooner rather than later. As such, it may be advantageous for any branch predictor to be as accurate as possible. That is, it is a waste of computational time and power to begin executing a set of instructions in a branch that is ultimately not taken such that any pipeline processor that begins executing a branch that is ultimately not taken may have to flush (i.e. delete) its computations. That is, such advance execution of instructions in a branch not taken typically provides no useful end.

BRIEF DESCRIPTION OF THE DRAWINGS

Embodiments of the subject matter disclosed herein will become more readily appreciated as the same become better understood by reference to the following detailed description, when taken in conjunction with the accompanying drawings.

DETAILED DESCRIPTION

The following discussion is presented to enable a person skilled in the art to make and use the subject matter disclosed herein. The general principles described herein may be applied to embodiments and applications other than those detailed above without departing from the spirit and scope of the subject matter disclosed herein. This disclosure is not intended to be limited to the embodiments shown, but is to be accorded the widest scope consistent with the principles and features disclosed or suggested herein.

By way of overview of an embodiment described in more detail below with respect to FIG. 3, a branch predictor may include a program-counter register operable to store a program-counter value and a branch-history register operable to store a branch-history value. Additionally, the branch predictor may include a prediction hash table having a plurality of prediction values each uniquely corresponding to a plurality of memory locations. With these components, the branch predictor may generate a first prediction value that corresponds to the program-counter value, and may generate a second prediction value that corresponds to a logical combination of the program-counter value and the branch-history value. With these two prediction values obtained from two different prediction schemas, the branch predictor may be better suited to generate an overall prediction value, based on the first and second prediction values, which is more accurate than a single prediction value based upon a single prediction schema. The foregoing components and concepts are described in greater detail below with respect to FIGS. 1-4.

Figure 1:
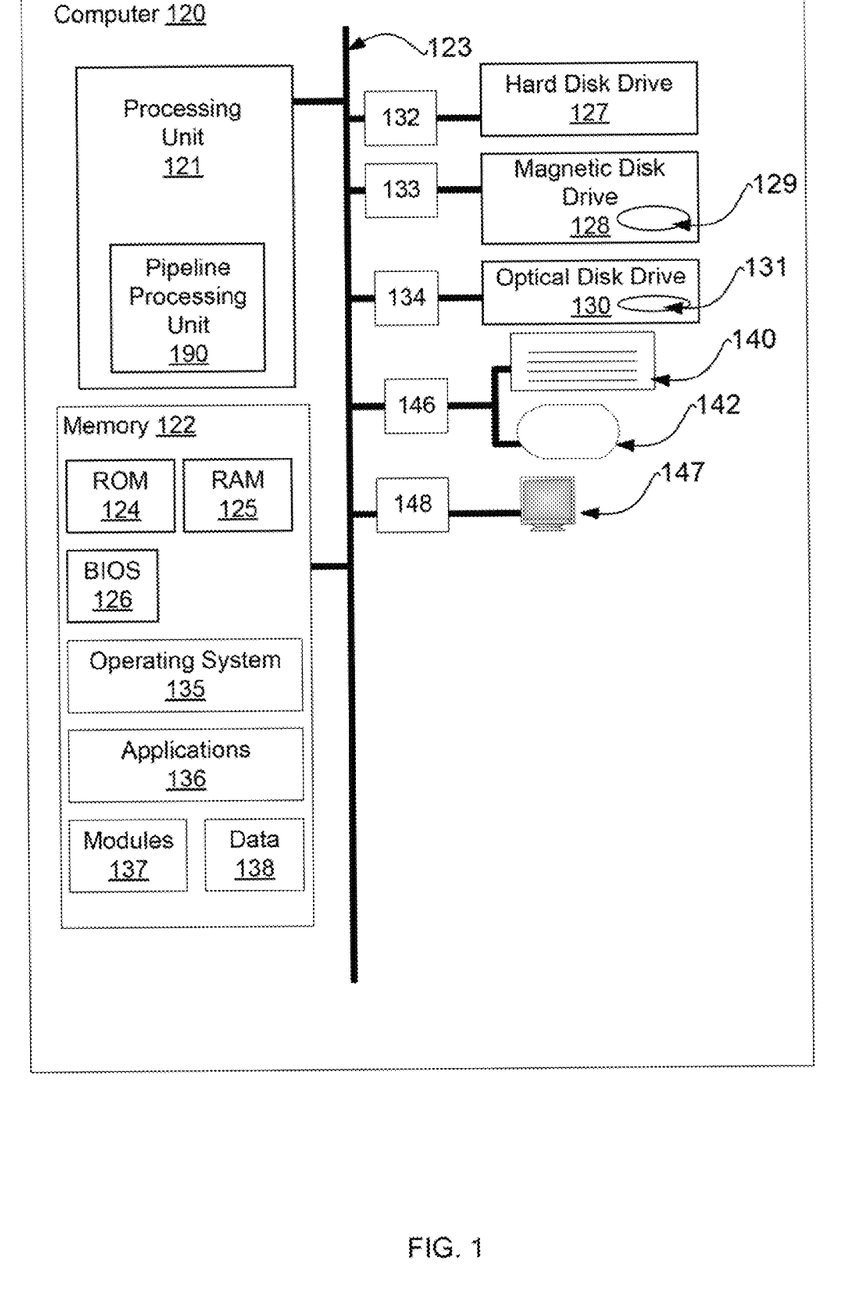
FIG. 1 is a diagram of a suitable superscalar computing environment wherein the system and method for branch prediction may be practiced according to an embodiment of the subject matter disclosed herein.

FIG. 1 and the following discussion are intended to provide a brief, general description of a suitable computing environment in which the subject matter disclosed herein may be implemented. Although not required, aspects of this system and method will be described in the general context of computer-executable instructions, such as program or computing modules, being executed by a computer-based software component, a computer-based hardware component, or logic components. Generally, computing modules may include routines, programs, objects, components, data structures, etc., that perform particular tasks or implement particular abstract data types. Moreover, those skilled in the art will appreciate that the subject matter disclosed herein may be practiced with other computer system configurations, including hand-held devices, cellular or mobile telephones, multiprocessor systems, microprocessor-based or programmable consumer electronics, network PCs, minicomputers, mainframe computers, and the like. Various methods may also be practiced in distributed computing environments where tasks are performed by remote processing devices that are linked through a communications network. In a distributed computing environment, computing modules may be located in both local and remote memory storage devices.

With reference to FIG. 1, an exemplary system for implementing the systems and methods disclosed herein includes a general purpose computing device in the form of a computer 120, including one or more processing units 121, a system memory 122, and a system bus 123 that couples various system components, including the system memory to the processing unit 121. The processing unit 121 may include one or more sub-processors that compose a pipeline processing unit 190, which enables the processing unit 121 to execute more than one instruction per clock cycle. Such a pipeline processing unit 190 may comprise a single integrated circuit chip or may be disposed as several circuits across several integrated circuits. Typically, a processor 121 with pipelining capabilities is designed to utilize several related logical processing chains which may semi-independently perform related instructions. This computing organization of the processor 121 allows overall processing time to be significantly reduced. Further yet, the processor 121 may be a vector processor that may execute the same instruction on large sets of data.

The system bus 123 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which is also known as Mezzanine bus.

The system memory includes read only memory (ROM) 124 and random access memory (RAM) 125. A basic input/output system (BIOS) 126, containing the basic routines that help to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard-disk-drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129, and a removable optical disk 131, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program or computing modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. These and other input devices are often connected to the processing unit 121 through a serial port interface 146 that is coupled to the system bus, but may be connected by other interfaces, such as a parallel port, high-speed data port or a universal serial bus (USB). A monitor 147 or other type of display device may also be connected to the system bus 123 via an interface, such as a video adapter 148.

Within the context of the computer system 120 of FIG. 1, a branch predictor may be realized in the form of a program module within the memory. Alternatively, such a branch predictor may be realized as a computing module within a hardware-based component of the processing unit. Various embodiments of a system of method for branch prediction are described below with respect to FIGS. 2-4.

Figure 2:
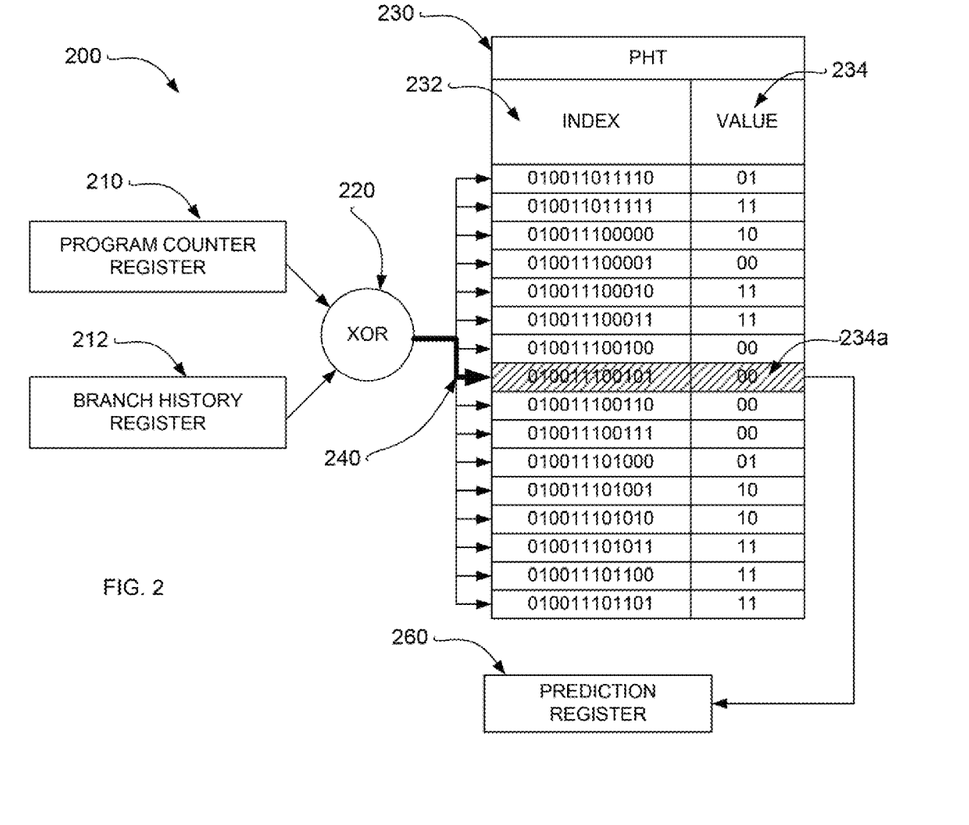
FIG. 2 is a diagram of a branch predictor using a prediction schema typically referred to as a Gshare prediction schema.

FIG. 2 is a diagram of a branch predictor 200 using a single prediction schema called a Gshare prediction schema. As may be understood in the art, the branch predictor 200 of FIG. 2 may be implemented as a computing module or set of computing modules as realized within a memory or realized as a logical component that may be part of a processing unit 121 of FIG. 1. Further, such a branch predictor 200 may be realized via logic components on a dedicated integrated circuit (IC) that may be part of a sub-processor such as the pipeline processing unit 190 of FIG. 1. Other embodiments are contemplated.

Any branch predictor, and in specific, the branch predictor 200 of FIG. 2, may make use of the concept that the behavior of many branches may be strongly correlated with the history of other recently taken branches. Thus, the branch predictor 200 may include a branch-history register 212 that includes data about whether or not other recently encountered branches have or have not been taken. Such recent history data may then be used to predict whether a next branch will be taken.

As discussed above, it may be desirable to increase the efficiency of a branch predictor as much as possible as any instruction executions that have begun for a specific branch ultimately not taken need to be flushed from a pipeline (i.e., discarded to no useful end). As such, the Gshare branch predictor 200 may utilize a program-counter value from a program-counter register 210 as well as a branch-history value from the branch-history register 212 to generate a branch-prediction value at a branch prediction register 260. The branch-prediction value may then be used to predict whether or not the specific branch will be taken.

During the operation of a program, branch prediction may be implemented when a trigger condition is met. A trigger condition may any number of typical operational scenarios, such as reaching a specific value at the program-counter register 210 (e.g., the branch instruction itself, five instructions before a branch instruction), a previous associated branch has begun execution, etc. Thus, when the trigger condition is met, the current program-counter value from the program-counter register 210 and the current branch-history value from the branch-history register 212 may be used to generate an index value as discussed further below.

The index value may be a logical combination (or other mathematical combination) of the program-counter value and the branch-history value. In one embodiment, the logical combination of these two values may be an exclusive-or function 220 (XOR function) of each bit of the two values. Thus, when generating the index value, each bit of the index value may be generated according to each bit in the respective operands (i.e., each bit from the corresponding program-counter value and branch-history value). The first bit of the branch register value may be compared against the first bit of the program-counter value to generate the first bit of the resultant index value. If the two values are the same (i.e., either both are 0 or both are 1) then the resulting bit in the generated index value may be set to 0. If however, one bit or the other may be a 1, then the resulting bit in the generated index value may be a 1. This operation may be executed for each bit in the respective operand values such that a resultant index value may be the exclusive-or function of the program-counter value and the branch-history value.

Once an index value is generated, it may be cross-referenced in a prediction hash table 230 (PHT) to identify a corresponding prediction value. The PHT 230 may be a lookup table having a several prediction values 234 that each correspond uniquely to a memory location having one each of any possible index value 232. Thus, for an index value that may be n bits long, the PHT 230 may have $2^n$ index value 232 entries, each having a unique associated prediction value 234. Each prediction value 234 may be a 2-bit binary value corresponding to the integers 0, 1, 2, or 3. As the index value 232 is generated and identified (i.e., the memory location is identified based upon the index value 240) in the PHT 230, a resulting prediction value 234 may be identified. As shown in the example of FIG. 2, the resultant index value 240 of "010011100101" is identified and a prediction value 234*a* of "00" may be predicted.

The prediction value 234*a* may then be used to determine whether or not the branch should be loaded into a processing component (i.e., a prediction to begin executing the branch) or should not be loaded (i.e., a prediction to not load the branch). In one embodiment, a prediction value of 0 or 1 may correspond to a prediction not to load the branch while a prediction value of 2 or 3 may correspond to a prediction to load the branch. In the example of FIG. 2, the 2-bit binary value of "00" may be a prediction value of 0 which corresponds to a prediction not to begin executing the branch ahead of time.

One particular problem with the branch predictor of FIG. 2 is that the generation of the index value 240 may not always result a unique identification of a specific prediction to take. For example, the same index value 234 may be generated based upon two different prediction requests depending on the contents of the branch-history register 212. Such non-exclusivity may be inherent to a branch predictor 200 that utilizes only the Gshare prediction schema (i.e., a single prediction schema) to identify a prediction value 234. As a result, a measurable error rate in accurately predicting whether a branch will be taken or not may result as a specific index value 240 may be cross-referenced by more than one logical combination of the branch-history register 212 and the program-counter register 210. By way of a simple 4-bit example, a program-counter value of "1101" (which may correspond to a trigger condition for branch A) and a branch-history value of "1010" (which may be indicative of the last four branches as being taken-not taken-taken-not taken) when indexed, results in an XOR index value of "0111." Similarly, a distinctly different program-counter value of "0110" (which may correspond to a trigger condition branch B) and a branch-history value of "0001" when indexed, also results in a XOR index value of "0111." Thus, for these two separate trigger conditions corresponding to needing a prediction for two different branches, the same index value 240 may be generated. This results in a PHT 230 interference as there may be no way to distinguish whether branch A or branch B is being predicted. Such errors in predicting may occur at rate that may be unacceptable. This error rate, however, may be reduced by introducing a second prediction schema as described below in the embodiment shown in FIG. 3.

Figure 3:
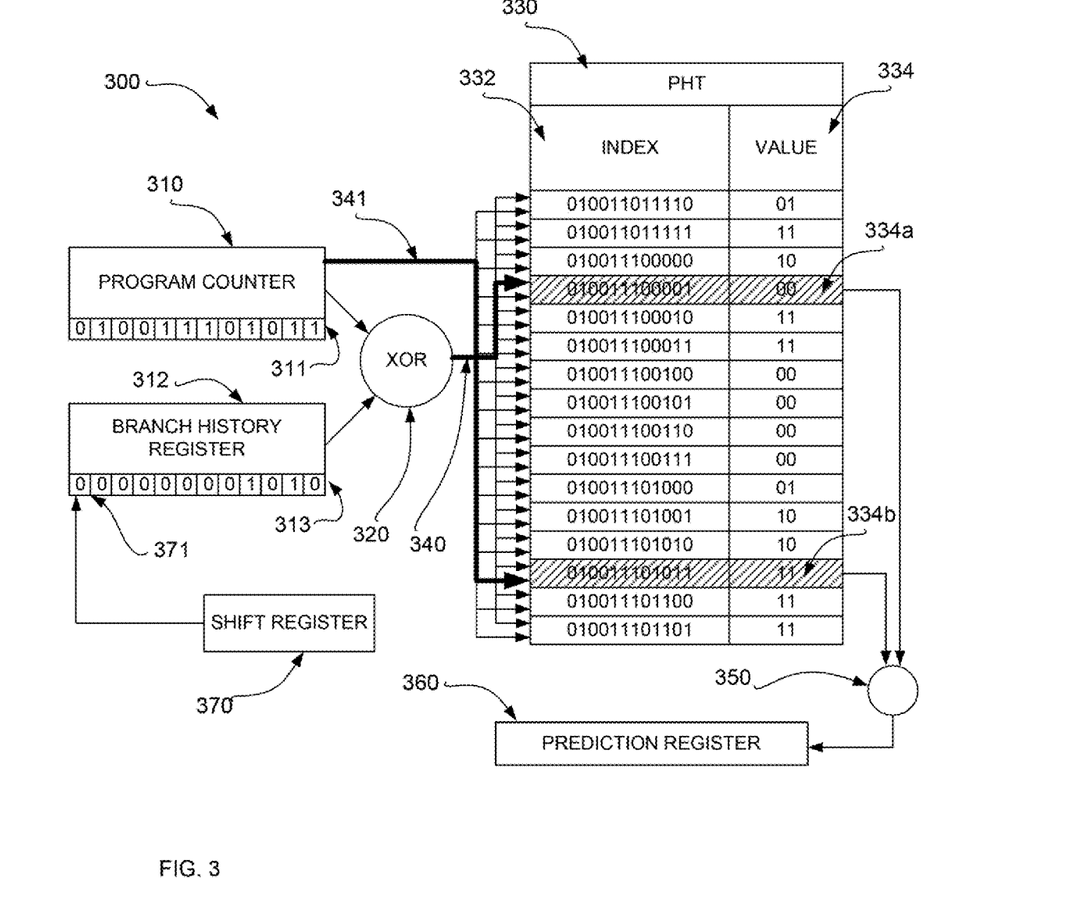
FIG. 3 is a diagram of a branch predictor using a combination of first and second branch prediction schemas to generate a branch prediction value according to an embodiment of the subject matter disclosed herein.

FIG. 3 is a diagram of a branch predictor 300 using first and second branch prediction schemas to generate a branch-prediction value according to an embodiment of the subject matter disclosed herein. Such a branch predictor 300 may be implemented in hardware or software. In this embodiment, when a trigger condition is met, a program-counter value 311 from a program-counter register 310 and a branch-history value 313 from a branch-history register 312 may be used to generate two index values. As discussed above, the first index value 340 may be a logical combination of the program-counter value 311 and the branch-history value 313. Different from the branch predictor 200 of FIG. 2, a second index value 341 may be generated that, for example, corresponds, bit-for-bit, with the program-counter value 311 in the program-counter register 310. In this manner, both index values 340 and 341 may be used to generate an overall resultant prediction value as described further below.

As shown in the embodiment of FIG. 3, the program-counter register 310 and the branch-history register 312 are shown as 12-bit registers. It may be understood by those skilled in the art that any size of register may be used and that the size of the registers used may not necessarily equate with the size of a global program counter (not shown). For size and computational savings issues, the size of the registers of FIG. 3 may correspond to a truncated value of the word size of a global program counter, e.g., the 12 least-significant bits of a 64-bit program counter.

In generating the first index value 340, the logical combination of the values in the program-counter register 310 and the branch-history register 312 may again be an exclusive-or function 320 (XOR function) of each bit of the two values. In alternative embodiments, logical operations other than an XOR function may be used to generate the first index value 340. For example, the logical operation may be an OR function or an AND function.

Additionally, a second index value 341 may be identified as well. In this embodiment, the second index value 341 may correspond, bit-for-bit, with the program-counter value 311 or some other identified value according to a first prediction schema.

Once each index value 340 and 341 is generated, each may be cross-referenced to respective memory locations in a prediction hash table 330 (PHT) to identify a corresponding prediction value 334. As before, the PHT 330 may be a look-up table having a several prediction values 334 that each correspond uniquely to any possible index value 332. Again, each prediction value 334 may be a 2-bit binary value corresponding to the integers 0, 1, 2, or 3. As an index value 332 may be generated and identified in the PHT 330, a resulting prediction value 334 may be identified. As shown in the example of FIG. 3, the first resultant index value 340 of "010011100001" may be identified and a prediction value 334*a* of "00" (i.e., 0) may be predicted. Similarly, the second resultant index value 341 of "010011101011" may be identified (which may be the same value that is in the program-counter register 310) and a prediction value 334*b* of "11" (i.e., 3) may be predicted. These two prediction values may be referred to as interim prediction values.

Once each of the two interim prediction values 334*a* and 334*b* are identified (one corresponding to the first index value 340 using a first prediction schema and one corresponding to the second index value 341 using a second prediction schema), a function unit 350 may mathematically generate an overall prediction value based upon the two interim values. The overall prediction value may also be referred to a final prediction value. In one embodiment, the function unit 350 may be encompass a summing function which adds the two interim prediction values 334*a* and 334*b* together such that each 2-bit interim value may be used to generate a 3-bit final prediction value. That is, the first and second interim values 334*a* and 334*b*, which are represented by a 2-bit binary value of 0, 1, 2, or 3, may be added together to yield a 3-bit binary final prediction value that may be a value of 0-7.

By using two prediction schemas to generate two interim prediction values 334*a* and 334*b*, the predetermined condition or threshold for determining whether or not to begin executing the branch may also be adjusted by a factor of 2. Thus, the final prediction value that may be sent to the prediction register 360, being a 3-bit binary value of 0-7 may generate a prediction to execute the branch if the value is 4, 5, 6, or 7 and a prediction to not begin executing the branch if the value is 0, 1, 2, or 3.

In an alternative embodiment, the function unit 350 may be an averaging function such the integer value of each interim prediction may be summed and the divide by two (e.g., an average of the two interim values). This may result in a non-integer number and the prediction register 360 may be a floating point register capable of storing a non-integer number. Thus, if the prediction register 360 holds a number equal to or greater than 2.0, a prediction to begin execution of the branch may be made. If the prediction register 360 holds a number less than 2.0, a prediction to not load the branch for execution may be made.

Still further, additional functions may be accomplished at the function unit 350, such as a weighted sum, wherein the first interim prediction value may be weighted, for example, twice as much as the second interim prediction value.

As predictions are made, the overall execution of the program proceeds normally. If a prediction to take a branch is made, then the branch instructions are loaded into a pipeline processor (or the like) for immediate execution. If the branch is then actually taken within the context of the overall program, then the prediction was correct. Of course, if the branch is ultimately not taken, then the prediction was incorrect and the pipeline is flushed such that any instructions already executed are discarded. In an effort to provide a better prediction rate, both the branch-history register 312 and the specific prediction values associated with the first and second index values may be updated according to whether or not the particular branch is actually taken.

When updating the branch-history register 312, a shift register 370 may be used to shift a bit into the most significant bit 371 of the branch-history register 312. That is, the most-significant bit may be displaced with the new value being shifted, and each bit may be shifted one bit to the right such that the least significant bit may be shifted out and discarded. Thus, if the branch is actually taken, a 1 bit may be shifted into the branch-history register 312 whereas if the branch is ultimately not taken, then a 0 bit may be shifted into the branch-history register 312. Further, in another embodiment, the least-significant bit of the branch-history register 312 may be shifted (thus, discarding the existing most-significant bit while all others shift to the left).

In one embodiment, the branch-history register 312 is a global register. That is, the bits that represent whether or not branches have been taken correspond to all branches. For example, if branches A, B, C, and D were the last four branches to be predicted, and all four were, in fact taken, then the last four bits shifted into the branch-history register will all be a 1. In other embodiments, each branch may be associated with its own dedicated branch-history register 312. Although not illustrated in FIG. 3, there may be one branch-history register for each branch in a program. In this respect, the only data contained in a specific branch-history register will be data corresponding to the history of one particular branch.

Further, the PHT prediction values 334a and 334b corresponding to the first and second index values 340 and 341 for the specific branch may also be updated according to whether or not the branch is actually taken. In one embodiment, if the associated prediction values 334a and 334b is smaller than the threshold and the branch is actually taken, then this value may be incremented by 1. Likewise, if the branch is actually not taken and the prediction value is larger than the threshold, then each prediction value may be decremented by 1.

In another embodiment, the associated prediction values 334a and 334b may incremented or decremented accordingly regardless of whether the current prediction value 334a and 334b is greater than or less than the threshold. That is, if the branch is taken, each associated prediction value may be incremented by 1 (so long as the value is not already at the maximum value of 3) and if the branch is not taken, then each associated prediction value may be decremented by 1 (again, so long as the prediction value is not already at the minimum value of 0). These and other concepts are described below in the context of a programmatic flowchart of FIG. 4.

Figure 4:
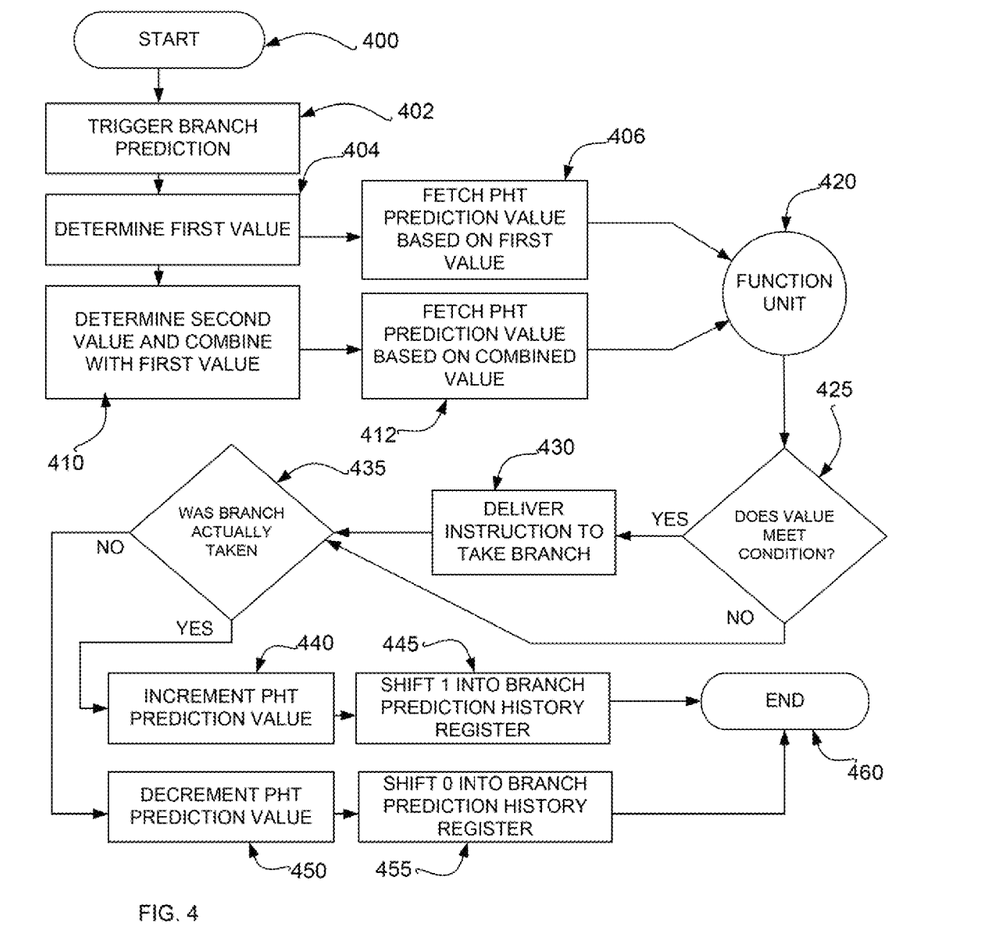
FIG. 4 is a flowchart of a method of predicting the likelihood of executing a branch according to an embodiment of the subject matter disclosed herein.

FIG. 4 is a flowchart of a method of predicting the likelihood of executing a branch according to an embodiment of the subject matter disclosed herein. In this method, a prediction may be made as to whether or not a specific branch will be executed based upon data from a first location having a first value (e.g., a program-counter register) as well as a data from a second location having a second value (e.g., a branch-history register). The method starts at step 400 and proceeds to step 402 wherein a trigger condition may be met such that the branch predictor generates a prediction based upon the aforementioned data sets. Such a trigger condition may be passing a specific address location in the program counter or may be predicting that a related branch is to be taken (or has been taken). Any number of trigger conditions are contemplated but not discussed further for brevity.

Once a trigger condition is met, the method moves to step 404 wherein the first value (a program-counter value for example) may be determined based upon the specific branch to be predicted. This value may be an address corresponding to the branch to be predicted or may be another related address, such as the address of the trigger condition. Once the first value has been determined, two additional steps may then occur.

First, at step 410 the first may be modified by an algorithm with the second value. As discussed above, this function may be an XOR function that logically combined the first value with the second value, yielding a resultant index value. Then, a PHT address may be determined for the resultant index value, wherein a prediction value corresponding to the PHT address may be determined at step 412. As discussed above, this value may be a two-bit binary value corresponding to 0, 1, 2, or 3.

Additionally, the first value may also be used to directly access another specific entry in the PHT at step 406. That is, the first value is not modified in any manner such that a specific prediction value corresponding to the PHT address may be determined. After these two steps, two different prediction values are obtained, one corresponding to the first index value (i.e., the XOR result) and one corresponding to the second index value (i.e., the first value).

Next, each of the two retrieved prediction values may be mathematically combined together at step 420. The combination may a simple addition of the two binary values corresponding to the associated prediction values. As such, a final prediction value may be determined based upon an arithmetic combination of the two fetched prediction values.

At decision step 425, a comparator determines whether the overall prediction value meets a specific condition. For example, the final prediction value may be equal to or greater than a threshold (e.g., equal to or greater than 4). If so, then the branch may be predicted to be taken. Then at step 430, an instruction may be delivered to a controlling processor to initiate loading of the instructions of the branch into a pipeline processor or the like. If, however, the overall prediction value does not meet a specific condition, (e.g., the value is less than or equal to three), then no action may be taken, i.e., no instruction to load the branch may be delivered as in step 430.

Additional embodiments are contemplated wherein the first value may correspond to the branch-history value and the second value may correspond to the program-counter value. Further, other values associated with the program may be used as the values involved with making the prediction, such as a global program counter with an offset, a PC address counter, a sub-routine counter, and the like. Further yet, more than two values may be combined to yield one of the interim values. As such, a logical combination of the branch-history register, the program-counter value and a PC address counter may be used to determine an interim value for prediction.

In yet another embodiment, more than two interim prediction values may be determined wherein each interim prediction value may be combined in a mathematical manner to determine an overall prediction value.

Next, both the PHT prediction values and the branch-history register may be updated according to whether or not the branch is actually taken. At decision step 435, a determination may be made as to whether or not the particular branch was actually taken (regardless of the prediction). If the branch was taken, then at step 440, the prediction value in both locations of the PHT corresponding to the two index values may be incremented by one in binary (e.g., 00 is incremented to 01, 10 is incremented to 11, etc.). Further, the method proceeds to step 445 wherein a value corresponding to whether or not the branch was actually taken may be shifted into the branch-history register. That is, if the branch is actually taken a 1 may be shifted into the least-significant bit of the branch-history register. This, of course, causes every bit in the register to also shift left by one bit of significance and the most significant bit may be shifted out of the register and discarded.

However, if the branch is ultimately not taken, then at step 450, the prediction value in both locations of the PHT corresponding to the two index values may be decremented by one in binary (e.g., 01 is decremented to 00, 10 is decremented to 01, etc.). Further, the method proceeds to step 455 wherein a value corresponding to whether or not the branch was actually taken may be shifted into the branch-history register. That is, if the branch is not taken, a 0 may be shifted into the least-significant bit of the branch-history register. After updating the PHT table and the branch-history register, the method ends at step 460.

While the subject matter discussed herein is susceptible to various modifications and alternative constructions, certain illustrated embodiments thereof are shown in the drawings and have been described above in detail. Furthermore, those skilled in the art will understand that various aspects described in less than all of the embodiments may, nevertheless, be present in any embodiment. It should be understood, however, that there is no intention to limit the subject matter to the specific forms disclosed, but on the contrary, the intention is to cover all modifications, alternative constructions, and equivalents falling within the spirit and scope of the subject matter disclosed.

What is claimed is:

1. A computing module, comprising:
   a first branch prediction module configured to
      generate a first prediction value corresponding to a branch prediction according to a first branch prediction schema that is based on a program-counter value in a program counter register, and
      store the first prediction value in a first hardware memory;
   a second branch prediction module configured to
      generate a second prediction value corresponding to a branch prediction according to a second branch prediction schema that is based on a logical combination of the program-counter value and a branch-history value in a branch history register, and
      store the second prediction value in the first hardware memory;
   a third branch prediction module configured to generate a third prediction value corresponding to a branch prediction according to a third branch prediction schema that is based on a sub-routine counter value; and
   a computation module configured to
      generate a fourth prediction value corresponding to a mathematical computation based upon a first non-zero weighting of the first branch prediction value and a second non-zero weighting of the second branch prediction value, and the third prediction value, and
      store the fourth prediction value in a second hardware memory.

2. The computing module of claim 1 wherein the logical combination comprises an XOR function of the program-counter value and the branch-history value.

3. The computing module of claim 1, further comprising a prediction hash table configured to store a plurality of prediction values each corresponding uniquely to a memory location.

4. The computing module of claim 1, wherein the branch-history register is configured to store a plurality of bits, each bit corresponding to a previous execution of a branch.

5. The computing module of claim 4, further comprising a shift register coupled to the branch-history register, the shift register configured to shift a bit value into a least significant bit of the branch-history register based on the execution of a branch.

6. The computing module of claim 1, further comprising an execution module operable to begin executing an instruction in response to the fourth prediction value meeting a predetermined condition.

7. A method for predicting executing a branch instruction, the method comprising:
   generating a first interim prediction value based upon a first prediction schema that is based on a program-counter value in a program counter register;
   generating a second interim branch prediction value based upon a second branch prediction schema that is based on a logical combination of the program-counter value and a branch-history value in a branch history register;
   generating a third interim branch prediction value based upon a third branch prediction schema that is based on a sub-routine counter value;
   calculating a final branch prediction value based upon the first, second, and third interim branch prediction values such that each of the first and second interim branch prediction values is weighted at different non-zero values; and
   executing the branch instruction if the final branch prediction meets a condition.

8. The method of claim 7 wherein the first prediction value is generated based upon a prediction hash table identifying a memory location corresponding to the program-counter value.

9. The method of claim 7 wherein the second prediction value is generated based upon a prediction hash table identifying a memory location corresponding to the logical combination of the program-counter value and the branch-history value.

10. The method of claim 7 further comprising executing the branch instruction if the final prediction value is equal to or greater than two.

11. The method of claim 7, further comprising:
determining whether the branch instruction has been executed; and
updating a prediction value stored in a prediction hash table corresponding to the executed branch instruction.

12. The method of claim 11, further comprising:
incrementing the stored prediction value if the branch instruction is executed; and
decrementing the stored prediction value if the associated branch instruction is not executed.

13. The method of claim 7, further comprising:
determining whether the branch instruction has been executed; and
updating the branch-history value by shifting a bit value into the branch-history register.

14. The method of claim 11, further comprising shifting a bit value of one if the branch instruction is executed and shifting a bit value of zero if the branch instruction is not executed.

15. A branch predictor, comprising:
a first hardware memory having a program-counter register configured to store a program-counter value;
a second hardware memory having a branch-history register configured to store a branch-history value;
a third hardware memory having a sub-routine counter register configured to store a sub-routine counter value;
a prediction hash table coupled to the first, second, and third hardware memories and having a plurality of prediction values each uniquely corresponding to a plurality of memory locations; and
a prediction component configured to
receive a first prediction value associated with a first hardware memory location that corresponds to the program-counter value;
receive a second prediction value associated with a second hardware memory location that corresponds to a logical combination of the program-counter value and the branch-history value;
receive a third prediction value associated with a third hardware memory location that corresponds to the sub-routine counter value; and
generate an overall prediction value based on a mathematical combination of the first, second, and third prediction values such that the first prediction value is weighted at least twice as much as the second prediction value.

16. The branch predictor of claim 15, wherein the prediction hash table comprises a plurality of index values each corresponding uniquely to a respective memory location and associated prediction value, wherein each prediction value comprises a binary value of 0, 1, 2, or 3.

17. The branch predictor of claim 15, wherein the prediction component is configured to generate the final value based on a summing function of the first and second prediction values.

18. The branch predictor of claim 15, wherein the prediction component is configured to generate the final value based on an averaging function of the first and second prediction values.

19. A pipeline processor, comprising:
a processor controller; and
a processor having a branch predictor coupled to the processor controller, the branch predictor comprising
a first branch prediction module configured to generate a first prediction value corresponding to a branch prediction according to a first branch prediction schema that is based on a program-counter value in a program counter register,
a second branch prediction module configured to generate a second prediction value corresponding to a branch prediction according to a second branch prediction schema that is based on a logical combination of the program-counter value and a branch-history value in a branch history register,
a third branch prediction module configured to generate a third prediction value corresponding to a branch prediction according to a third branch prediction schema that is based on a sub-routine counter value, and
a computation module configured to generate a fourth prediction value corresponding to a mathematical computation based upon a first non-zero weighting of the first branch prediction value, a second non-zero weighting of the second branch prediction value, and the third prediction value.

20. The pipeline processor of claim 19 further comprising a substrate carrying the processor and the processor controller are carried to define a single integrated circuit chip.

21. A computer system, comprising:
a processing unit;
a system bus;
a memory coupled to the processing unit via the system bus and comprising a program counter register and a branch history register; and
the processing unit comprising a pipeline processor configured to communicate with the memory predict execution of a branch of instructions by
generating a first interim prediction value based upon a first prediction schema that includes a program-counter value in the program counter register,
generating a second interim branch prediction value based upon a second branch prediction schema that includes a logical combination of the program-counter value and a branch-history value in the branch history register,
generating a third interim branch prediction value based upon a third branch prediction schema that includes a sub-routine counter value,
calculating a final branch prediction value based upon the first, second, and third interim branch prediction values such that the first interim branch prediction value contributes to the calculation at approximately twice the weighting of the second interim branch prediction value, and
communicating an instruction to execute the branch of instructions if the final branch prediction value exceeds a threshold.

22. A non-transitory computer-readable medium having computer-executable instructions for:
generating a first interim prediction value based upon a first prediction schema that includes a program-counter value in a program counter register;
generating a second interim branch prediction value based upon a second branch prediction schema that includes a logical combination of the program-counter value and a branch-history value in a branch history register;
generating a third interim branch prediction value based upon a third branch prediction schema that includes a sub-routine counter value;

calculating a final branch prediction value based upon a first non-zero weighting of the first interim branch prediction value, a second non-zero weighting of the second interim branch prediction value, and the third interim branch prediction value; and
executing the branch instruction if the final branch prediction meets a predetermined condition.

* * * * *